(12) United States Patent
Myrah et al.

(10) Patent No.: US 8,966,210 B2
(45) Date of Patent: Feb. 24, 2015

(54) ZONE GROUP CONNECTIVITY INDICATOR

(75) Inventors: Michael G. Myrah, Tomball, TX (US);
Aaron L. Jenkins, Tomball, TX (US);
Brian M. Spencer, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 13/079,554

(22) Filed: Apr. 4, 2011

(65) Prior Publication Data
US 2012/0254578 A1 Oct. 4, 2012

(51) Int. Cl.
*G06F 3/00* (2006.01)
*G06F 12/00* (2006.01)
*H04L 12/26* (2006.01)
*H04L 29/08* (2006.01)

(52) U.S. Cl.
CPC ......... *H04L 43/0811* (2013.01); *H04L 67/1097* (2013.01)
USPC ............................................. 711/170; 710/17

(58) Field of Classification Search
CPC ......... G06F 15/173; G06F 12/00; G06F 3/00; H01R 13/58
USPC ........................................... 711/170; 710/17
See application file for complete search history.

(56) References Cited

U.S. PATENT DOCUMENTS

| | | | |
|---|---|---|---|
| 7,610,418 B2 | 10/2009 | Holland et al. | |
| 7,644,304 B2 | 1/2010 | Kotzur et al. | |
| 7,668,925 B1 | 2/2010 | Liao et al. | |
| 7,730,252 B2 | 6/2010 | Odenwald et al. | |
| 2006/0155928 A1* | 7/2006 | Mimatsu | ........................ 711/112 |
| 2007/0094472 A1 | 4/2007 | Marks et al. | |
| 2007/0162592 A1* | 7/2007 | Marks et al. | ................... 709/224 |
| 2008/0126582 A1* | 5/2008 | Holland et al. | ..................... 710/6 |
| 2010/0036948 A1 | 2/2010 | Cassiday et al. | |
| 2010/0115073 A1 | 5/2010 | Odenwald, Jr. et al. | |

OTHER PUBLICATIONS

Hewlett-Packard Development Company, L.P., "HP 3G Virtual SAS Manager User Guide", Third Edition, HP Part No. 516649-003, Published Feb. 2011, pp. 1-86, Available at http://h20000.www2.hp.com/bc/docs/support/SupportManual/c01956986/c01956986.pdf, last accessed on Apr. 4, 2011.
Hewlett-Packard Development Company, L.P., "Serial Attached SCSI Technology", Technology Brief, 3rd Edition, TC101218TB, Dec. 2010, pp. 1-20, Avaliable at http://h20000.www2.hp.com/bc/docs/support/SupportManual/c01613420/c01613420.pdf, last accessed on Apr. 4, 2011.

* cited by examiner

*Primary Examiner* — Farley Abad
(74) *Attorney, Agent, or Firm* — International IP Law Group, PLLC (57) ABSTRACT

A method for allocating storage space is provided. The method includes receiving an assignment of an interconnect bay port to a zone group, wherein the interconnect bay port corresponds to a switch that operatively couples a storage controller to the zone group. The method also includes sending a command to the switch to determine whether the storage controller is operatively coupled to the interconnect bay port. The method also includes generating a display that indicates whether the storage controller is operatively coupled to the interconnect bay port.

20 Claims, 5 Drawing Sheets

ZONE GROUP CONNECTIVITY INDICATOR

BACKGROUND

Direct-attached storage (DAS) refers to a data storage system that is directly attached to a server or workstation. The data capacity and connectivity of the DAS system may be improved through the use of switches or expanders, which enable a large bank of DAS devices to be coupled to multiple servers. The storage resources of the DAS devices are made accessible to servers by configuring zone groups, which control how the expanders route connections through the switch to couple specific servers to specific storage drives. Often, components of the DAS system are implemented as blade devices deployed in a blade enclosure. For example, a single blade enclosure may include several blade servers, array controllers, SAS switches, and storage drives, among other components. The blade enclosure can provide a variety of services such as power, cooling, networking, various interconnects, and system management.

In a blade-based SAS switch storage configuration, a zone group can be configured by assigning a group of drive bays to one or more initiators via the blade enclosure interconnect bay ports. Blade servers can include slots, referred to as mezzanine slots, which are configured to receive expansion cards that provide additional functionality to the blade server. When an initiator, such as an array controller, is inserted into a blade server mezzanine slot, the controller's ports are routed to designated interconnect bay ports. Zone groups may be assigned to these interconnect bay ports. In some cases, configuring a zone group is not always as simple as it appears. For example, mezzanine slots in blade servers may be routed through physical connections to specific interconnect bay locations of the blade enclosure. If the user is unclear about how the physical connections are routed, the user may incorrectly assign a zone group to the wrong interconnect bay port.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Embodiments of the present techniques provide a system and a method for providing additional feedback to a user that enables the user to ensure that zone groups are correctly configured. In an embodiment, a storage manager sends SAS commands to the SAS switch expander to determine whether the specified interconnect bay port associated with the zone group is actually coupled to the intended storage controller. The storage management software may then generate a display, viewable by the user, that provides the results received in response to the SAS commands. In this way, the user is able to more quickly verify the specified zoning configuration and complete the DAS system setup.

Figure 1:
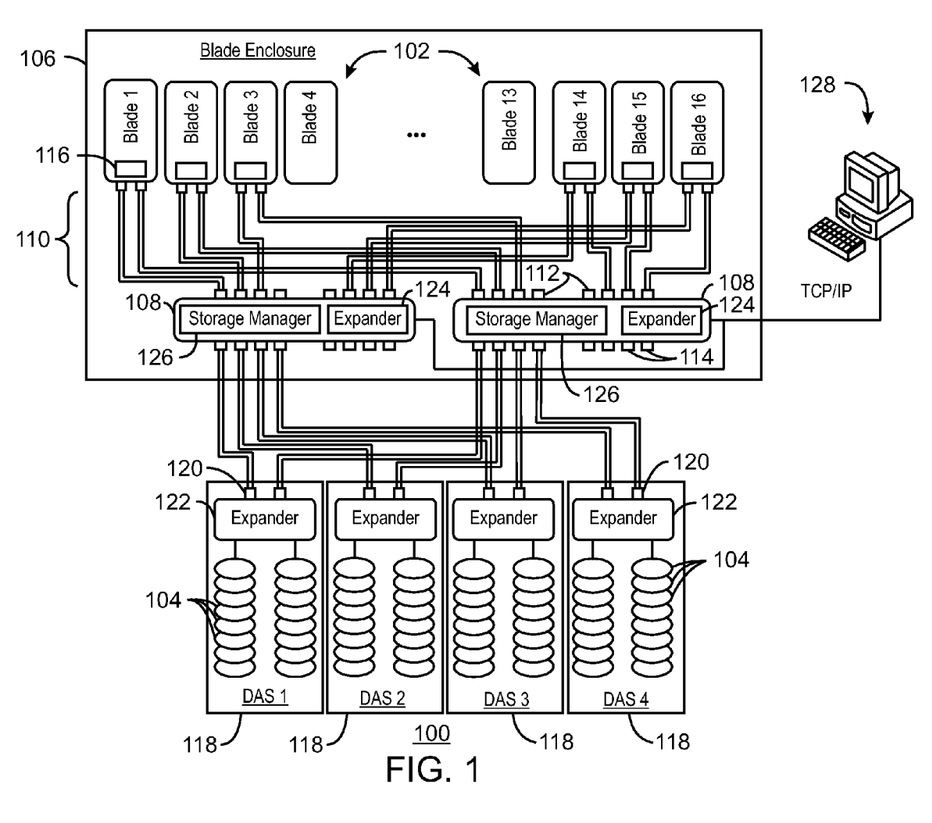
FIG. 1 is a block diagram of a DAS system in accordance with embodiments.

FIG. 1 is a block diagram of a DAS system in accordance with embodiments. The DAS system 100 may include one or more blade servers 102, each blade server 102 operatively coupled to one or more storage drives 104. In an embodiment, the blade servers 102 and the storage drives 104 use the Serial Attached Small Computer System Interface (SAS) protocol for connecting and transferring data.

The blade servers 102 may be included in a blade enclosure 106 that provides physical interconnections for coupling the blade servers 102 to the storage drives 104 through one or more switches 108, such as SAS switches. For example, the blade enclosure 106 may include one or more blade bays for receiving blade servers 102 and one or more interconnections bays for receiving the switches 108. The blade bays and the interconnection bays may be coupled to one another through hardwired interconnections 110 disposed in the blade enclosure 106. The two ends of a hardwired interconnection are referred to as a port 112. Each switch 108 includes interconnect bay ports 112 for coupling the switch to the internal components within the blade enclosure 106 and external switch ports 114 for coupling the switch 108 to the storage drives 104.

Each blade servers 102 may include one or more mezzanine slots (not shown) configured to receive a storage controller 116. Each Mezzanine slot may provide PCIe-based communications between the blade server 102 and the storage controller 116 installed in the blade server's mezzanine slot. Each mezzanine slot may include one or more ports that couple the storage controller 116 to the switches 108 through hardwired interconnections 110 of the blade enclosure 106.

In an embodiment, the storage drives 104 are included in one or more storage enclosures 118, and the external switch ports 114 of the blade enclosure 106 are coupled to external ports 120 of an expander 122 included in the storage enclosure 118. Each storage enclosure 118 may include a plurality of storage drives 104 disposed in drive bays of the storage enclosure 118. The storage enclosures 118 provides hardwired interconnections between the expander 122 and the drive bays and associated storage drives 104 included in the storage enclosure 118.

Each switch 108 may include an expander 124 that controls the routing between the interconnect bay ports 112 coupled to the blade servers 102 and external switch ports 114 coupled to the storage drives 104. Each switch 108 may also include and a storage manager 126 for configuring the switch's expander 124. Commands may be sent from the storage manager 126 to configure the expander 124 such that a particular blade server 102 will be operatively coupled to one or more drive bays specified by the user. In this way, the user may assign any interconnect bay port 112 and the associated mezzanine storage controller 116 to any of the drive bays and associated storage drives 104. Each storage controller 116 may be referred to as an initiator, and each storage drive 104 may be referred to as a target.

The storage manager may be operatively coupled to a storage administration device 128 through a TCP/IP network connection, for example. The storage administration device 128 may be, for example, a general purpose computer that enables an administrator to configure the switches 108 remotely. The storage administration device 128 may also receive information from the switches 108 regarding the switch configuration. The storage administration device may include a display for displaying information received from the switches 108.

In an embodiment, the user may configure the connectivity between the interconnect bay ports 112 and the storage drives 104 by defining zone groups using the storage manager 126. A zone group is a group of one or more drive bays that can be assigned to one or more initiators via the interconnect bay ports 112 of the blade enclosure 106. When an initiator, such as the storage controller 116, is inserted into a blade server's mezzanine slot, the storage controller's ports are routed to designated interconnect bay ports 112, which are viewable from the storage administration device 128 based on configuration information received from the storage manager 126. A zone group can be assigned to a specific interconnect bay port.

It will be appreciated that the DAS system shown in FIG. 1 is but one example of a DAS system in accordance with present embodiments, as various elements may be added or removed in accordance with a particular implementation. For example, the blade enclosure 106 may include any suitable number of blade bays, blade servers, and switches. Further, the DAS system may include any suitable number of DAS enclosures, with any suitable number of drive bays, and storage drives. It will also be appreciated that, in additional to blade systems, embodiments of the present techniques also apply to rack mount server solutions wherein, rather than using interconnect bay ports, the storage manager would detect whether the PHYs are linked up between the array controller cabled directly to the SAS switch.

Figure 2:
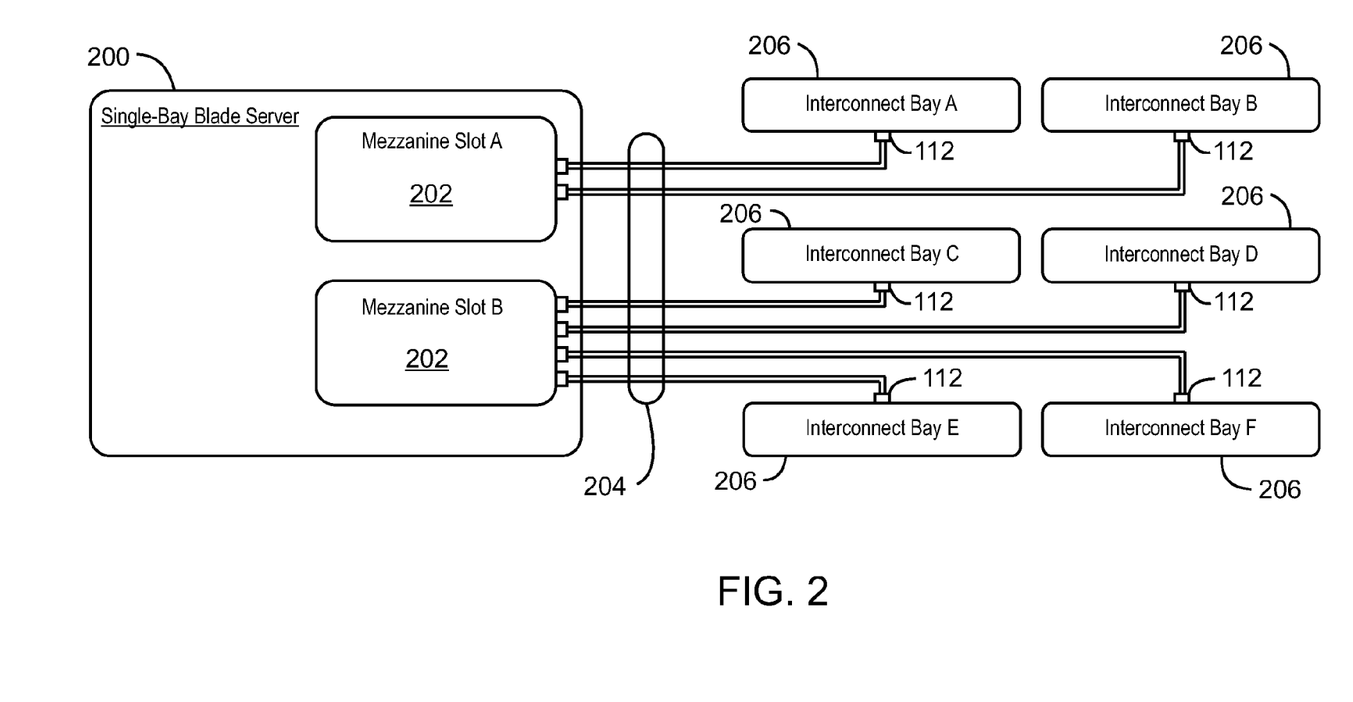
FIG. 2 is a block diagram showing a port mapping of a single-bay blade server, in accordance with embodiments.

FIG. 2 is a block diagram showing a port mapping of a single-bay blade server, in accordance with embodiments. As noted above, the blade server 200 may include mezzanine slots 202 configured to receive a storage controller, such as an array controller. Each mezzanine slot 202 may include one or more ports, coupled to interconnect bays through the hardwired physical connections 204 provided by the blade enclosure 106. Each port may include one or more components commonly referred to as PHYs (not shown). A PHY is a physical layer transmitter/receiver pair for sending and receiving signals transmitted over the physical connections. As used herein, a port is a set of one or more PHYs that have the same SAS address.

Although each of the ports shown in FIG. 2 includes two PHYs, it will be appreciated that a port can include a single PHY or more than two PHYs, for example, 3 to 8 PHYs or more. The PHYs of a single port are associated with a SAS address that is common to each PHY of the port. The SAS addresses may be determined at an initialization time and are unique to each port. Information about the state of the DAS system may be gathered by the storage manager (FIG. 1) by querying the PHYs and receiving a response indicating the state of the PHY. For example, the response to a query may indicate whether the PHY is enabled, whether the PHY is attached to a SAS device, the type of device attached to the PHY, and the like. A Query may be initiated by the administrator, and information corresponding to the query response may be sent back to the storage administration device and displayed.

The ports of each the mezzanine slots 202 may be coupled to the interconnect bays 206 of the blade enclosure 106, which are labeled A through F. The blade enclosure 106 may also include additional interconnect bays (not shown) used for other purposes, such as providing connectivity to a network, such as an Ethernet network. In a typical user configuration, an array controller may be installed in one mezzanine slot 202, and two SAS switches may be installed in adjacent interconnect bays. Each mezzanine slot 202 is connected to a different interconnect bay port 112 of the switch installed in the interconnect bay 206. The customer configures the zoning by assigning permissions on the interconnect bay ports 112. Configurations with multiple array controllers and more than two switches, or only one switch, may also be implemented. The connectivity between the mezzanine slots 202 and the interconnect bays varies by blade server model. Thus, it will be appreciated that the techniques are not limited to this configuration for the blade enclosure 106, as any number of configurations can be used.

The port mapping is more complicated with blade servers that occupy two blade bays and may have four mezzanine slots 202 (commonly referred to as "full-height" blade servers), and blade servers that occupy four blade bays and may have seven mezzanine slots 202 (commonly referred to as "full-height, double wide" blade servers.) To illustrate the confusion that can arise during the configuration of zone groups an example configuration for a full-height blade server is shown in FIG. 3.

Figure 3:
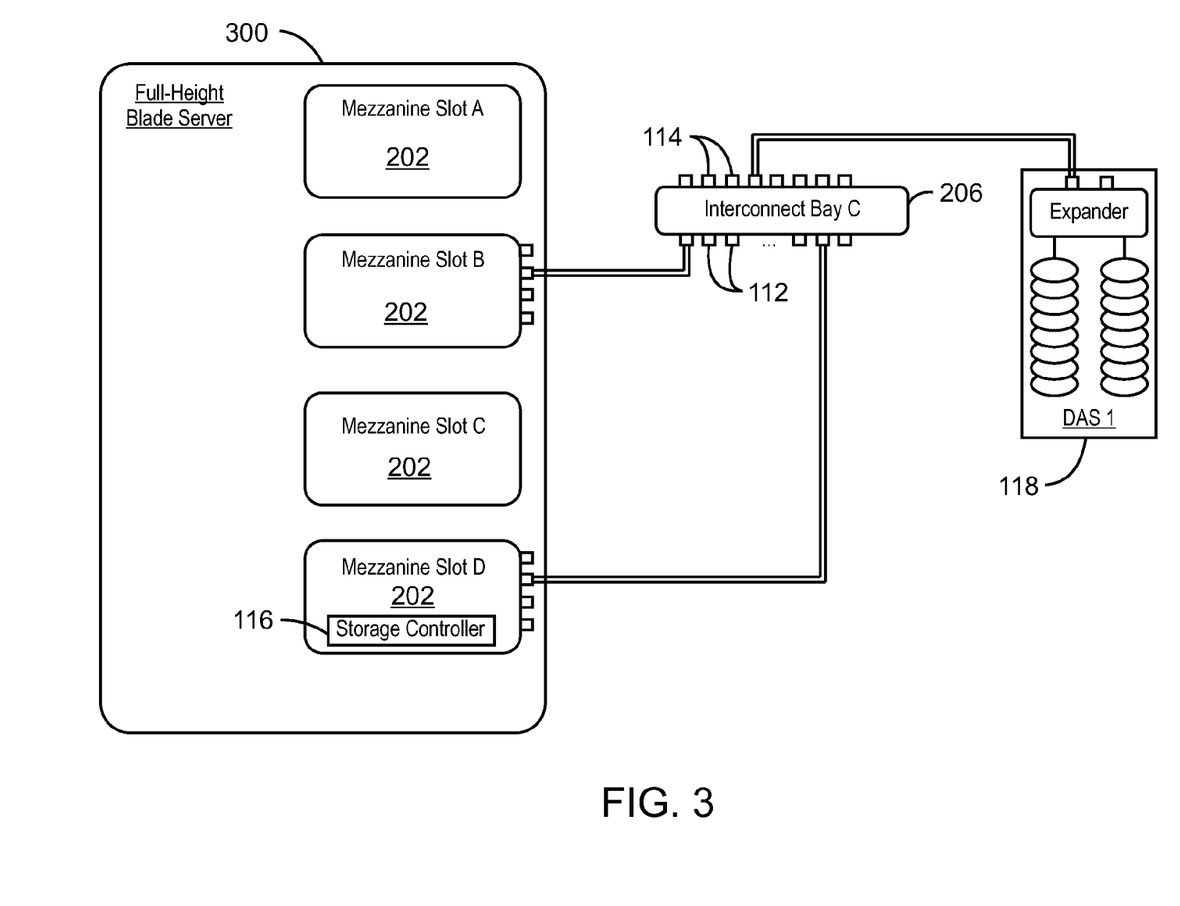
FIG. 3 is a block diagram showing a port mapping of a full-height blade server, in accordance with embodiments.

FIG. 3 is a block diagram showing a port mapping of a full-height blade server, in accordance with embodiments. The full-height blade server 300 shown in FIG. 3 includes four mezzanine slots 202 and can occupy any two adjacent blade bays. In the configuration shown in FIG. 3, the full-height blade server 200 occupies two blade bays that are known by the user as blade bays 1 and 9. Furthermore, the full-height blade server 200 may be known by the user as blade 1. Additionally, in the example configuration of FIG. 3, the user has installed a SAS switch 108 in an interconnect bay 206 referred to as interconnect bay C. For the sake of clarity, only interconnect bay C is shown. However, it will be appreciated that the blade enclosure may include multiple interconnect bays 206 as discussed above. When a full-height blade server 200 is installed in the blade enclosure 106, some of the interconnect bays 206 may have connectivity to more than one mezzanine slot 202 on the blade server 300. For example, as shown in FIG. 3, two of the ports of the full-height blade server 300 are connected to interconnect bay C. Specifically, one of the ports is connected to port 1 of interconnect bay C through mezzanine slot B, and one of the ports is connected to port 9 of interconnect bay C through mezzanine slot D. An array controller is installed in mezzanine slot D.

Confusion may arise when the customer attempts to assign a zone group to the full-height blade server 300. The zone group is assigned by granting one of the interconnect bay ports 112 access to the zone group. A proper configuration in this example is to grant access to the zone group through interconnect bay port 9, which is coupled to the storage controller 116 in mezzanine slot D. However, the customer may erroneously specify interconnect bay port 1 because the blade server 300, in addition to occupying blade bay 9, also occupies blade bay 1 and is referred to as blade 1.

The same confusion may arise any time a single blade server has more than one path to the switch and is therefore connected to more than one interconnect bay port. For example, this same kind of confusion can arise between mezzanine slots A and C when using interconnect bays 3 or 4. Additionally, there are other blade server types (e.g., full-height double-width) that can have more than two port connections to a single interconnect bay. To alleviate potential confusion, the storage management application may be configured to provide additional feedback to the user indicating whether the zone groups are properly configured. In an embodiment, when a user assigns a zone group to an interconnect bay port, the storage manager sends SAS commands to the SAS expanders on the SAS switch to determine whether the PHY's of a specific mezzanine slot 202 are linked up, as described further below in reference to FIG. 4.

Figure 4:
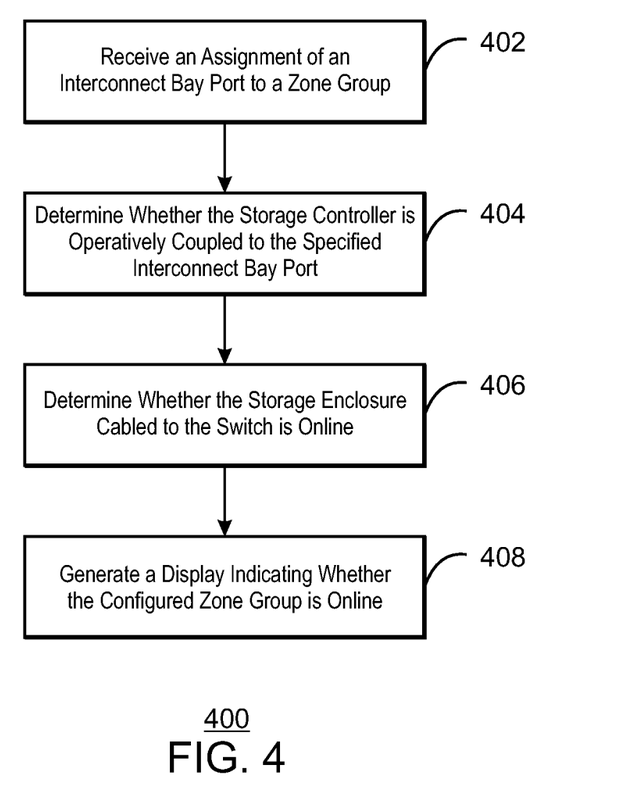
FIG. 4 is a process flow diagram of a method of providing feedback indicating whether the zone groups are properly configured, in accordance with embodiments.

FIG. 4 is a process flow diagram of a method of providing feedback indicating whether the zone groups are properly configured, in accordance with embodiments. The method 400 may be performed by the storage manager. The method may begin at block 402, wherein a command is received that assigns a specified interconnect bay port to a specified zone group. The interconnect bay port may correspond to a SAS switch that operatively couples one of the storage controllers in the blade enclosure to one or more of the storage drives of the storage enclosures. For example, the user may specify the interconnect bay port that the user believes will operatively couple the zone group to the specific mezzanine slot that contains the storage controller. In response to the command, the storage manager may configure the corresponding switch in accordance with the command by sending a command to the switch expander that routes the specified interconnect bay port to the external ports corresponding to the specified zone group.

At block 404, the storage manager may query the interconnect bay ports of the SAS switch to determine whether the storage controller is operatively coupled to the specified interconnect bay port. In an embodiment, the storage manager queries the state of the switch's interconnect bay port PHYs. For example, the query may be a SAS protocol command such as the "DISCOVER" or "DISCOVER LIST" commands, which may be sent to the expander of the SAS switch 108. The DISCOVER command may be used to query one or more specific PHYs, which are specified within the command. The DISCOVER LIST command may be used to query all of the PHYs associated with the switch 108.

A response to the DISCOVER or DISCOVER LIST commands may be received by the storage manager from the expander. The response may include an indication regarding whether the PHY or PHYs are in a linked-up state. For example, the response to the DISCOVER or DISCOVER LIST commands may include an "ATTACHED DEVICE TYPE" field for each associated PHY. A value of 0 in the ATTACHED DEVICE TYPE field may indicate no device is physically linked up to the corresponding PHY. If there is no controller in the mezzanine slot corresponding to the specified interconnect bay port, the PHY's associated with the specified interconnect bay port will not be in the linked up state. However, if there is a storage controller present and online, the PHYs will be in the linked up state.

At block 406, the storage manager may query the external ports of the SAS switch to determine whether the storage enclosure cabled to the switch is online. For example, the storage manager may query the state of the switch's external port PHYs using the DISCOVER or DISCOVER LIST commands, as discussed above in reference to block 404. The response received from the expander may include an indication regarding whether the PHY or PHYs associated with the zones group are in a linked-up state. If the storage enclosure associated with the external switch port PHYs of the zone group is not operatively coupled, the PHYs associated with the external ports of the zone group will not be in a linked-up state. However, if the storage enclosure is operatively coupled and online, the PHYs associated with external ports of the zone group will be in the linked up state.

At block 408, the storage manager may generate a display, viewable by the user, indicating whether the configured zone group is online, meaning that both the initiator and target PHYs of the Zone group are in a linked-up state. The display may be generated based on the PHY information received at blocks 404 and/or 406 in response to the DISCOVER or DISCOVER LIST commands. For example, if the ATTACHED DEVICE TYPE field for the PHY associated with the specified interconnect bay port indicates that no device is physically linked to the PHY, the display indicates that the storage controller is not operatively coupled to the interconnect bay port. The display may also indicate that a PHY associated with a different interconnect bay port is linked to a storage controller. Thus, it would be easy for the user to recognize the error made in configuring the zone group. The display may also include an indication regarding whether the external switch ports associated with the zone group are operatively coupled to the storage enclosure. Additionally, the display may include an indication regarding whether the zone group is online. The zone group may be shown as online if both the interconnect port PHYs and the external port PHYs associated with the zone group are in a linked-up state. The display generated by the storage manager may be any suitable type of display, including a command line interface, graphical user interface, and the like. Additionally, the display may be generated on a liquid crystal display (LCD) or light emitting diode (LED) display provided on the on the switch itself.

Figure 5:
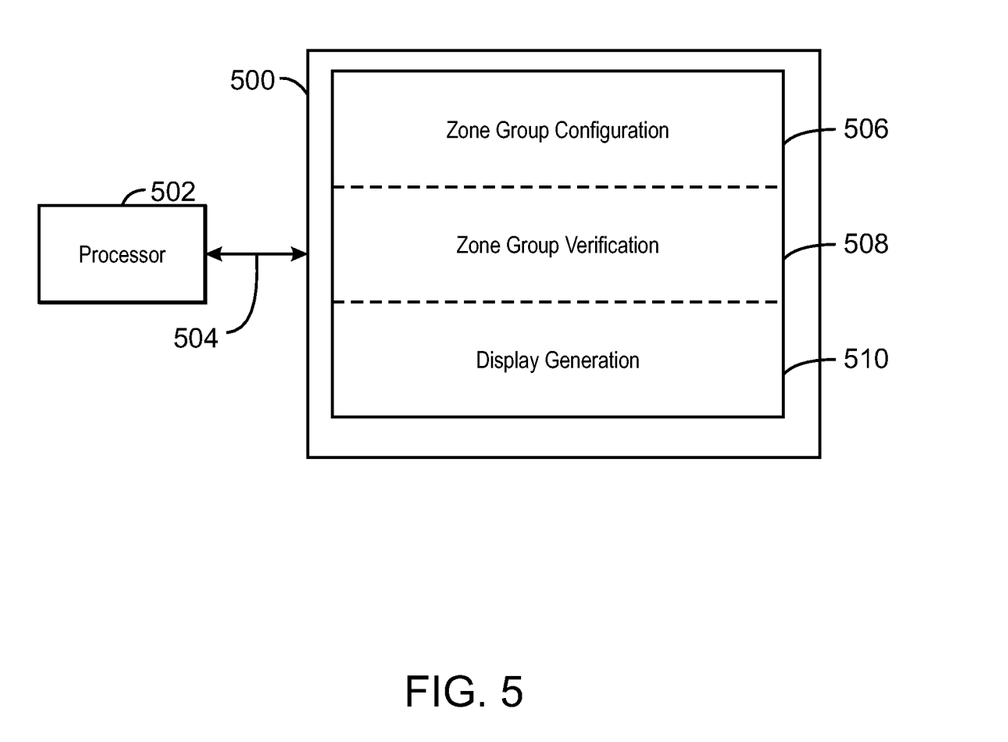
FIG. 5 is a block diagram showing a non-transitory, computer-readable medium that stores code for a storage management application, in accordance with embodiments.

FIG. 5 is a block diagram showing a non-transitory, computer-readable medium that stores code for a storage management application, in accordance with embodiments. The non-transitory, computer-readable medium is generally referred to by the reference number 500. The non-transitory, computer-readable medium 500 may correspond to any typical storage device that stores computer-implemented instructions, such as programming code or the like. For example, the non-transitory, computer-readable medium 500 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 502 generally retrieves and executes the instructions stored in the non-transitory, computer-readable medium 500 to process storage management operations in accordance with embodiments. In an embodiment, the tangible, machine-readable medium 500 can be accessed by the processor 502 over a computer bus 504. A first region 506 of the non-transitory, computer-readable medium 500 may include a zone group configuration module configured to receive an assignment of an interconnect bay port to a zone group, wherein the interconnect bay port corresponds to a switch that operatively couples a storage controller to the zone group. The zone group configuration module may also be configured to send a command to the switch expander, in response to the zone group assignment, that routes the specified interconnect bay port to the external ports corresponding to the specified zone group.

A second region 508 of the non-transitory, computer-readable medium 500 may include a zone group verification module configured to send a command to the switch to determine whether the storage controller is operatively coupled to the interconnect bay port. The zone group verification module may also be configured to send a command to the switch to determine whether an external port of the switch is operatively coupled to a storage enclosure of the zone group. For example, the commands may include a DISCOVER command or a DISCOVER LIST command, which can be sent to an expander of the switch associated with the zone group. A third region 510 of the non-transitory, computer-readable medium 500 may include a display generation module configured to generate a display that indicates whether the storage controller is operatively coupled to the interconnect bay port and, based on the data received by the zone group verification module.

Although shown as contiguous blocks, the software components can be stored in any order or configuration. For example, if the non-transitory, computer-readable medium 500 is a hard drive, the software components can be stored in non-contiguous, or even overlapping, sectors.

What is claimed is:

1. A method, comprising:
   receiving an assignment of an interconnect bay port to a zone group, wherein the interconnect bay port corresponds to a switch that operatively couples a storage controller to the zone group;
   sending a command to the switch to determine whether the storage controller is operatively coupled to the interconnect bay port;
   generating a display that indicates whether the storage controller is operatively coupled to the interconnect bay port.

2. The method of claim 1, wherein sending the command comprises sending a DISCOVER or DISCOVER LIST command to an expander of the switch.

3. The method of claim 1, comprising, in response to the command, receiving an ATTACHED DEVICE TYPE field from the switch, the ATTACHED DEVICE TYPE field corresponding to a PHY of the interconnect bay port.

4. The method of claim 3, wherein if the ATTACHED DEVICE TYPE field indicates that no device is physically linked to the PHY, the display indicates that the storage controller is not operatively coupled to the interconnect bay port.

5. The method of claim 1, comprising
   sending a second command to the switch to determine whether an external port of the switch is operatively coupled to a storage enclosure of the zone group; and
   generating a display that indicates whether the external port of the switch is operatively coupled to the storage enclosure.

6. The method of claim 5, comprising, in response to the second command, receiving a second ATTACHED DEVICE TYPE field from the switch, the second ATTACHED DEVICE TYPE field corresponding to a PHY of the external port.

7. The method of claim 6, wherein if the second ATTACHED DEVICE TYPE field indicates that no device is physically linked to the PHY of the external port, the display indicates that the external port of the switch is not operatively coupled to the storage drive.

8. A system comprising:
   a blade enclosure comprising a blade bay and an interconnect bay, the interconnect bay comprising an interconnect bay port;
   a blade server disposed in the blade bay, the blade server comprising a storage controller;
   a switch disposed in the interconnect bay that operatively couples the storage controller to a zone group; and
   a storage manager configured to:
      receive an assignment of the interconnect bay port to the zone group;
      send a command to the switch to determine whether the storage controller is operatively coupled to the interconnect bay port; and
      generate a display that indicates whether the storage controller is operatively coupled to the interconnect bay port.

9. The system of claim 8, wherein the storage manager is configured to send the command by sending a DISCOVER or DISCOVER LIST command to an expander of the switch.

10. The system of claim 8, wherein the storage manager is configured to receive an ATTACHED DEVICE TYPE field from the switch in response to the command, the ATTACHED DEVICE TYPE field corresponding to a PHY of the interconnect bay port.

11. The system of claim 10, wherein if the ATTACHED DEVICE TYPE field indicates that no device is physically linked to the PHY, the display indicates that the storage controller is not operatively coupled to the interconnect bay port.

12. The system of claim 8, wherein the storage manager is configured to:
   send a second command to the switch to determine whether an external port of the switch is operatively coupled to a storage enclosure of the zone group; and
   generate a display that indicates whether the external port of the switch is operatively coupled to the storage enclosure.

13. The system of claim 12, wherein the storage manager is configured to receive a second ATTACHED DEVICE TYPE field from the switch in response to the second command, the second ATTACHED DEVICE TYPE field corresponding to a PHY of the external port.

14. The system of claim 13, wherein if the second ATTACHED DEVICE TYPE field indicates that no device is physically linked to the PHY of the external port, the display indicates that the external port of the switch is not operatively coupled to the storage drive.

15. A non-transitory, computer-readable medium, comprising code configured to direct a processor to:
   receive an assignment of an interconnect bay port to a zone group, wherein the interconnect bay port corresponds to a switch that operatively couples a storage controller to the zone group;
   send a command to the switch to determine whether the storage controller is operatively coupled to the interconnect bay port;
   generate a display that indicates whether the storage controller is operatively coupled to the interconnect bay port.

16. The non-transitory, computer-readable medium of claim 15, comprising code configured to direct the processor to send the command by sending a DISCOVER or DISCOVER LIST command to an expander of the switch.

17. The non-transitory, computer-readable medium of claim 15, comprising code configured to direct the processor to receive an ATTACHED DEVICE TYPE field from the switch in response to the command, the ATTACHED DEVICE TYPE field corresponding to a PHY of the interconnect bay port.

18. The non-transitory, computer-readable medium of claim 15, comprising code configured to direct the processor to, wherein if the ATTACHED DEVICE TYPE field indicates that no device is physically linked to the PHY, the display indicates that the storage controller is not operatively coupled to the interconnect bay port.

19. The non-transitory, computer-readable medium of claim 15, comprising code configured to direct the processor to:
   send a second command to the switch to determine whether an external port of the switch is operatively coupled to a storage enclosure of the zone group; and
   generate a display that indicates whether the external port of the switch is operatively coupled to the storage enclosure.

20. The non-transitory, computer-readable medium of claim 15, comprising code configured to direct the processor to, receive a second ATTACHED DEVICE TYPE field from the switch in response to a second command, the second ATTACHED DEVICE TYPE field corresponding to a PHY of the external port, wherein if the second ATTACHED DEVICE TYPE field indicates that no device is physically linked to the PHY of the external port, the display indicates that the external port of the switch is not operatively coupled to the storage drive.

\* \* \* \* \*